(12) United States Patent
Robinson et al.

(10) Patent No.: US 8,939,407 B2
(45) Date of Patent: Jan. 27, 2015

(54) COMMON BULKHEAD FOR COMPOSITE PROPELLANT TANKS

(75) Inventors: Michael James Robinson, Huntington Beach, CA (US); Michael Leslie Hand, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 272 days.

(21) Appl. No.: 13/027,429

(22) Filed: Feb. 15, 2011

(65) Prior Publication Data

US 2012/0205493 A1   Aug. 16, 2012

(51) Int. Cl.
| B64G 1/00 | (2006.01) |
| B64C 1/10 | (2006.01) |
| B32B 3/30 | (2006.01) |
| B64G 1/10 | (2006.01) |
| B64G 1/40 | (2006.01) |

(52) U.S. Cl.
CPC ... *B64C 1/10* (2013.01); *B32B 3/30* (2013.01); *B64G 1/10* (2013.01); *B64G 1/402* (2013.01)
USPC ............... 244/172.2; 244/172.1; 220/4.12; 220/4.15; 220/500; 165/170

(58) Field of Classification Search
USPC .......... 244/172.2; 220/4.12, 4.15, 500, 565, 220/560, 469; 165/170
See application file for complete search history.

(56) References Cited

U.S. PATENT DOCUMENTS

| 2,755,216 A | 7/1956 | Lemons |
| 3,124,032 A | 3/1964 | Webster et al. |
| 3,243,150 A | 3/1966 | Woodcock |
| 3,400,849 A | 9/1968 | Pottier et al. |
| 3,814,275 A | 6/1974 | Lemons |
| 4,086,378 A | 4/1978 | Kam et al. |
| 4,331,723 A | 5/1982 | Hamm |
| 4,395,450 A | 7/1983 | Whitener |
| 4,452,162 A * | 6/1984 | Harbaugh .................. 114/74 A |
| 4,922,798 A | 5/1990 | Ivsan et al. |
| 5,018,634 A * | 5/1991 | Le Touche .................. 220/4.12 |
| 5,026,595 A | 6/1991 | Crawford, Jr. et al. |

(Continued)

FOREIGN PATENT DOCUMENTS

| CA | 2203863 | 10/1998 |
| EP | 1149687 A2 | 10/2001 |

(Continued)

OTHER PUBLICATIONS

USPTO Final Office Action, U.S. Appl. No. 12/841,413, Mar. 6, 2013, 11 pages.

(Continued)

*Primary Examiner* — Luke Ratcliffe
*Assistant Examiner* — Assres H Woldemaryam
(74) *Attorney, Agent, or Firm* — Yee & Associates, P.C.

(57) ABSTRACT

An apparatus comprising a first structure, a second structure, a first layer, and a second layer. The first structure has a first plurality of channels extending towards a number of edges of the first structure. The second structure has a second plurality of channels extending towards a number of edges of the second structure. A first side of the first structure is connected to a first side of the second structure. The first plurality of channels and the second plurality of channels have an orientation with respect to each other. The first layer is connected to a second side of the first structure. The second layer is connected to a second side of the second structure.

11 Claims, 11 Drawing Sheets

(56) References Cited

U.S. PATENT DOCUMENTS

| | | | |
|---|---|---|---|
| 5,338,383 A | | 8/1994 | Polackowyj |
| 5,611,453 A | | 3/1997 | Schwartz et al. |
| 5,628,363 A | * | 5/1997 | Dewar et al. .................. 165/164 |
| 5,651,474 A | | 7/1997 | Callaghan et al. |
| 5,655,600 A | * | 8/1997 | Dewar et al. .................. 165/166 |
| 5,845,399 A | * | 12/1998 | Dewar et al. ............... 29/890.03 |
| 5,951,812 A | | 9/1999 | Gilchrist, Jr. |
| 6,267,175 B1 | * | 7/2001 | Anderson .................... 165/166 |
| 6,374,570 B1 | | 4/2002 | McKague, Jr. |
| 6,422,514 B1 | * | 7/2002 | Clark et al. ............... 244/135 R |
| 6,562,436 B2 | | 5/2003 | George et al. |
| 6,689,448 B2 | | 2/2004 | George et al. |
| 6,709,538 B2 | | 3/2004 | George et al. |
| 6,757,954 B2 | | 7/2004 | Sei |
| 6,835,261 B2 | | 12/2004 | Schmidt et al. |
| 6,846,758 B2 | | 1/2005 | Bhatnagar et al. |
| 6,863,767 B2 | | 3/2005 | Bersuch et al. |
| 6,874,543 B2 | | 4/2005 | Schmidt et al. |
| 6,945,727 B2 | | 9/2005 | Christman et al. |
| 7,669,729 B2 | | 3/2010 | Matsuoka et al. |
| 7,790,294 B2 | | 9/2010 | Macguire et al. |
| 7,904,147 B2 | | 3/2011 | Schneider et al. |
| 8,042,767 B2 | | 10/2011 | Velicki et al. |
| 8,656,571 B2 | | 2/2014 | Hand |
| 2001/0047862 A1 | * | 12/2001 | Anderson et al. ............. 165/170 |
| 2003/0000641 A1 | | 1/2003 | Schmidt et al. |
| 2006/0065111 A1 | | 3/2006 | Henry |
| 2007/0239212 A1 | | 10/2007 | Schneider et al. |
| 2008/0256960 A1 | | 10/2008 | Greason et al. |
| 2009/0042474 A1 | | 2/2009 | Lin et al. |
| 2009/0311166 A1 | | 12/2009 | Hart et al. |
| 2010/0012787 A1 | | 1/2010 | Hand |
| 2010/0080942 A1 | | 4/2010 | McCarville et al. |
| 2010/0116420 A1 | | 5/2010 | Matsuoka et al. |
| 2011/0049750 A1 | | 3/2011 | Bechtold |
| 2012/0018587 A1 | | 1/2012 | Robinson et al. |
| 2013/0136527 A1 | | 5/2013 | Robinson et al. |
| 2013/0193151 A1 | | 8/2013 | Robinson et al. |
| 2014/0077037 A1 | | 3/2014 | Hand |

FOREIGN PATENT DOCUMENTS

| | | |
|---|---|---|
| EP | 2006074 A1 | 12/2008 |
| EP | 2354622 A1 | 8/2011 |
| EP | 2439059 A2 | 4/2012 |
| WO | WO9730321 A1 | 8/1997 |
| WO | 0216784 | 2/2002 |

OTHER PUBLICATIONS

USPTO Office Action, U.S. Appl. No. 12/841,413, Oct. 15, 2012, 18 pages.

Search and Examination Report, dated Jan. 7, 2013, regarding Application No. GB1111333.9, 3 pages.

Robinson et al., "Device for Controlling Stress in Joints at Cryogenic Temperatures and Method of Making the Same," U.S. Appl. No. 13/541,534, filed Jul. 30, 2012, 57 Pages.

Robinson et al., "Composite Tank Having Joint with Softening Strip and Method of Making the Tank," U.S. Appl. No. 13/541,560, filed Jul. 3, 2012, 55 Pages.

"Softening Strip Material Characterization", DC-XA Task 2 Test Report 6.0.Doc, retrieved Jun. 27, 2008, pp. 1-9.

"2D Softened Y-Joint Simulation", DC-XA Task 2 Test Report 7.0. Doc, retrieved Jun. 27, 2008, pp. 1-9.

U.S. Appl. No. 12/838,586, filed Jul. 19, 2010, Robinson et al.

U.S. Appl. No. 12/175,735, filed Jul. 18, 2008, Hand.

U.S. Appl. No. 12/841,502, filed Jul. 22, 2010, Robinson et al.

Office Action issued on Sep. 12, 2011 for U.S. Appl. No. 12/175,735.

Blanco et al., "Limiting Mechanisms of Mode I Interlaminar Toughening of Composites Reinforced with Alligned Carbon Nanotubes," Journal of Composite Materials, vol. 43, No. 8, Apr. 2009, 18 Pages.

Garcia et al., "Joining prepreg composite interfaces with aligned carbon nanotubes," Composites: Part A, Applied Science and Manufacturing, vol. 39, Issue 6, Jun. 2008, pp. 1065-1070.

Wicks et al., "Interlaminar and intralaminar reinforcement of composite laminates with aligned carbon nanotubes," Composite Science and Technology (2009), vol. 70, Issue 1, Jan. 2010, 9 Pages.

Wardle et al., "Fabrication and Characterization of Ultrahigh-Volume-Fraction Aligned Carbon Polymer Composites," Advanced Materials, vol. 20, Issue 14, Jun. 2008, 8 Pages.

Thomson, "'Nanostitching' could lead to much stronger airplane skins, more, Work could make airplane skins, other products 10 times stronger at a nominal additional cost," MIT News, Mar. 2009, 2 Pages, accessed Mar. 9, 2012 http://web.mit.edu/newsoffice/2009/nanostitching-0305.html.

USPTO restriction requirement dated May 23, 2011 regarding U.S. Appl. No. 12/175,735, 8 Pages.

USPTO final office action dated Jan. 20, 2012 regarding U.S. Appl. No. 12/175,735, 9 Pages.

PCT search report dated May 4, 2012 regarding application PCT/US2011/065549, filed Dec. 16, 2011, applicant The Boeing Company, 12 Pages.

Veedu et al., "Multifunctional composites using reinforced laminae with carbon-nanotube forests," Nature Materials (www.nature.com/naturematerials), vol. 5, Jun. 2006, pp. 457-462, accessed Jun. 4, 2012 http://image.sciencenet.cn/olddata/kexue.com.cn/blog/admin/images/upfiles/20085981740331929.pdf.

Koch IV, U.S. Appl. No. 12/841,413, title of invention Toughened Composite Filler and Method of Making the Same, filed Jul. 22, 2010, 44 Pages.

GB search report dated Nov. 4, 2011 regarding application GB1111333.9, applicant The Boeing Company, 7 Pages.

Office Action, dated Jul. 3, 2013, regarding USPTO U.S. Appl. No. 12/841,502, 42 pages.

Notice of Allowance, dated Oct. 9, 2013, regarding USPTO U.S. Appl. No. 12/175,735, 33 pages.

Final Office Action, dated Jan. 16, 2014, regarding USPTO U.S. Appl. No. 12/841,502, 16 pages.

International Search Report and Written Opinion, dated Nov. 19, 2013, regarding Application No. PCT/US2013/043455, 9 pages.

International Search Report and Written Opinion, dated May 21, 2014, regarding Application No. PCT/US2013/043471, 11 pages.

Office Action, dated Jul. 10, 2014, regarding USPTO U.S. Appl. No. 12/841,502, 23 pages.

* cited by examiner

//COMMON BULKHEAD FOR COMPOSITE PROPELLANT TANKS

BACKGROUND INFORMATION

1. Field

The present disclosure relates generally to rocket propelled vehicles. More particularly, the present disclosure relates to a method and apparatus for a common bulkhead for composite propellant tanks.

2. Background

High altitude aircraft, missiles, launch vehicles and satellites are examples of vehicles which may be rocket propelled. These rocket propulsion systems may use liquid or gaseous propellants. Liquid propellants may include, for example, without limitation, liquid hydrogen and/or liquid oxygen. Other common combinations include kerosene with liquid oxygen or the storable hypergolic propellants mono-methyl hydrazine with nitrogen tetroxide.

Propellants are stored in tanks. When more than one tank is present, common walls may be interposed between the tanks. This common wall may also be referred to as a common bulkhead. These types of tanks are often comprised of metal. However, recently, tanks comprised of composite materials have also been used. Tanks comprised of composite materials may result in lower vehicle weights, as compared to metal tanks.

Two propellants may be stored in two tanks having a common wall. Pressure within the tanks may be different on the two sides of the common wall between the two tanks. The common wall may be designed to resist undesired structural changes resulting from this differential pressure and/or other vehicle loads. For many common bulkhead applications, it is desirable that undesired structural changes be reduced and/or prevented with as little weight as possible. For example, sandwich construction bulkheads may be comprised of facesheets on either side of a connecting lightweight core. These types of bulkheads are lighter for a given load resistance or more structurally efficient, as compared to a simple monocoque membrane or skin and stiffener construction.

The rocket propellants stored in tanks are used for their ability to react energetically. Bulkheads may be used in fuel tanks to separate propellants. Currently used bulkheads may provide an undesired transfer of heat.

Therefore, it would be advantageous to have a method and apparatus that takes into account one or more of the issues discussed above, as well as possibly other issues.

SUMMARY

In one advantageous embodiment, an apparatus comprises a first structure, a second structure, a first layer, and a second layer. The first structure has a first plurality of channels extending towards a number of edges of the first structure. The second structure has a second plurality of channels extending towards a number of edges of the second structure. A first side of the first structure is connected to a first side of the second structure. The first plurality of channels and the second plurality of channels have an orientation with respect to each other. The first layer is connected to a second side of the first structure. The second layer is connected to a second side of the second structure.

In another advantageous embodiment, a launch vehicle comprises a structural system, a first tank associated with the structural system, a second tank associated with the structural system, and a wall. The wall is common between the first tank and the second tank. The wall comprises a first structure, a second structure, a first layer, and a second layer. The first structure has a first plurality of channels extending towards a number of edges of the first structure. The second structure has a second plurality of channels extending towards a number of edges of the second structure. A first side of the first structure is connected to a first side of the second structure. The first plurality of channels and the second plurality of channels have an orientation with respect to each other. The first layer is connected to a second side of the first structure. The second layer is connected to a second side of the second structure.

In yet another advantageous embodiment, a method is provided for forming a wall. A first structure is placed on a first layer. The first structure has a first plurality of channels. A second structure is placed on the first structure. The second structure has a second plurality of channels. The first plurality of channels and the second plurality of channels have an orientation with respect to each other. A second layer is placed on the second structure. The first layer, the second layer, the first structure, and the second structure are components for the wall. The components are cured to form the wall.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
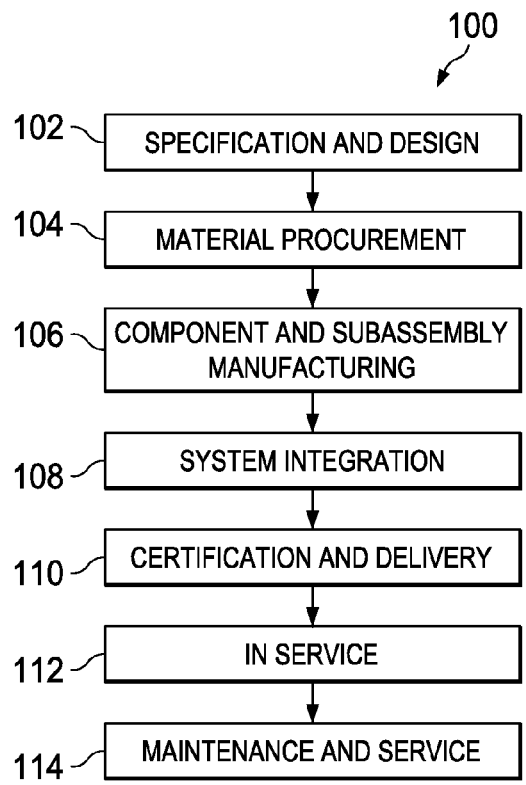
FIG. 1 is an illustration of a spacecraft manufacturing and service method in accordance with an advantageous embodiment.
Figure 2:
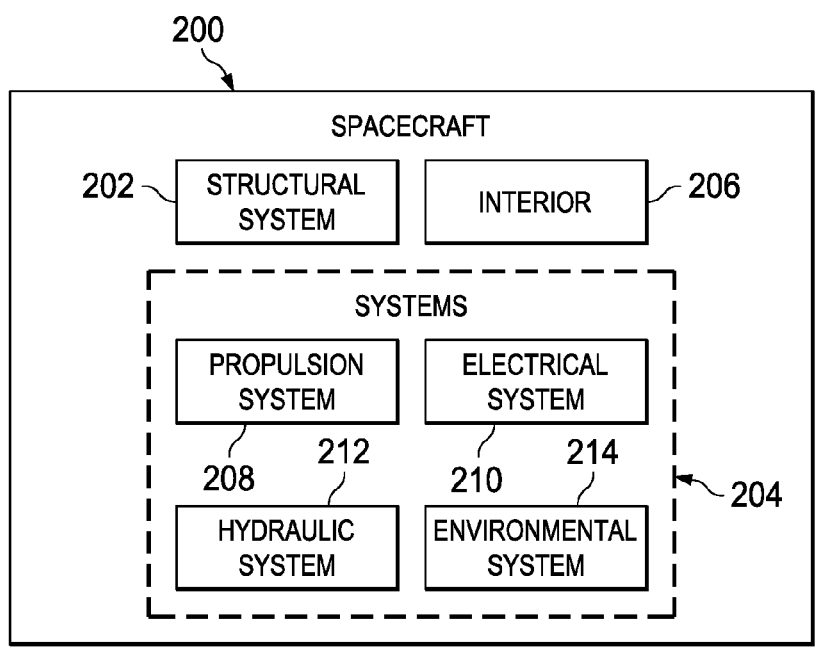
FIG. 2 is an illustration of a spacecraft in which advantageous embodiments may be implemented.

Referring more particularly to the drawings, embodiments of the disclosure may be described in the context of spacecraft manufacturing and service method 100 as shown in FIG. 1 and spacecraft 200 as shown in FIG. 2. Turning first to FIG. 1, an illustration of a spacecraft manufacturing and service method is depicted in accordance with an advantageous embodiment.

During pre-production, exemplary spacecraft manufacturing and service method 100 may include specification and design 102 of spacecraft 200 in FIG. 2 and material procurement 104. During production, component and subassembly manufacturing 106 and system integration 108 of spacecraft 200 in FIG. 2 may take place. Thereafter, spacecraft 200 in FIG. 2 may go through certification and delivery 110 in order to be placed in service 112. While in service 112 by a customer, spacecraft 200 in FIG. 2 may be scheduled for routine maintenance and service 114, which may include modification, reconfiguration, refurbishment, and other maintenance or service.

Each of the processes of spacecraft manufacturing and service method 100 may be performed or carried out by a system integrator, a third party, and/or an operator. In these examples, the operator may be a customer. For the purposes of this description, a system integrator may include, without limitation, any number of spacecraft manufacturers and major system subcontractors; a third party may include, for example, without limitation, any number of vendors, subcontractors, and suppliers; and an operator may be a country, leasing company, military entity, service organization, and other suitable types of operators.

With reference now to FIG. 2, an illustration of a spacecraft is depicted in which advantageous embodiments may be implemented. In this example, spacecraft 200 may be produced by spacecraft manufacturing and service method 100 in FIG. 1. Spacecraft 200 may include structural system 202 with a plurality of systems 204 and interior 206. Structural system 202 is a frame or housing for different systems in spacecraft 200. Structural system 202 is similar to the fuselage of an airplane.

Examples of systems 204 may include, for example, without limitation, one or more of propulsion system 208, electrical system 210, hydraulic system 212, and environmental system 214. Any number of systems may be included. Further, in some implementations, some of the systems may not be needed. For example, when spacecraft 200 takes the form of a launch vehicle, environmental system 214 may be unnecessary.

Apparatuses and methods embodied herein may be employed during at least one of the stages of spacecraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while spacecraft 200 is in service 112 in FIG. 1.

Also, a number of apparatus embodiments, method embodiments, or a combination thereof may be utilized during production stages, such as component and subassembly manufacturing 106 and system integration 108 in FIG. 1 as an example, without limitation. A number, when referring to items, means one or more items. For example, "a number of apparatus embodiments" is one or more apparatus embodiments. These embodiments may substantially expedite the assembly of, or reduce the cost of, spacecraft 200.

In these examples, advantageous embodiments may be implemented in components in propulsion system 208 in spacecraft 200. In particular, the advantageous embodiments may be implemented in structures for tanks in propulsion system 208 that hold propellants in spacecraft 200. The different advantageous embodiments may be used with any structure within spacecraft 200 in which a common wall is present between structures.

The different advantageous embodiments recognize and take into account a number of different considerations. For example, without limitation, the different advantageous embodiments recognize and take into account that it would be desirable to increase the strength of a wall between tanks in a manner that does not increase the weight beyond a desired level.

The different advantageous embodiments recognize and take into account that one manner in which the weight of tanks may be reduced is to fabricate the tanks using composite materials. The different advantageous embodiments recognize and take into account that a composite tank may be pressurized and configured to hold a liquid and/or gas. The different advantageous embodiments also recognize and take into account that the use of different propellants between two tanks having a common wall may result in pressures that are uneven on either side of the common wall.

The different advantageous embodiments recognize and take into account that propellants may permeate through composite facesheets that are used in a sandwich construction with a core to form a bulkhead between two tanks. The different advantageous embodiments recognize and take into account that mixing rocket propellants with air or an oxidizer may cause an explosion or some other type of undesired event.

The different advantageous embodiments recognize and take into account that one manner in which the strength of a common wall between tanks may be increased is to employ a honeycomb sandwich structure. This type of structure comprises a core containing cells having a pattern similar to a honeycomb. The core is located between two facesheets.

The different embodiments also recognize and take into account that, although a honeycomb sandwich structure may be lighter, a honeycomb sandwich structure may increase the risk of mixing between the propellants in the two tanks. A propellant may permeate or leak through a facesheet into the honeycomb cells. If the propellant leaks from the facesheet on the other side, the two propellants may then mix within the honeycomb cells because of the orientation of the cells with respect to the facesheet. The different advantageous embodiments recognize and take into account that with curved walls, this type of structure may be difficult and expensive to produce.

Additionally, the different advantageous embodiments recognize and take into account that, with a honeycomb structure, the possibility of a facesheet de-bonding from a honeycomb cell may increase with a smaller surface area for bonding between the facesheets and the edges of the honeycomb cells in the core.

The different advantageous embodiments recognize and take into account that the chances of de-bonding may increase when the temperature differences between propellants in the two different tanks are great enough. These types of differences in temperatures may occur with cryogenic propellants or a mixture of cryogenic and non-cryogenic propellants.

Thus, the different advantageous embodiments provide a method and apparatus for a common wall used in a tank. In particular, this common wall may be a wall between two tanks. These tanks may hold a liquid and/or gas. The apparatus comprises a first structure, a second structure, a first layer, and a second layer. The first structure, the second structure, the first layer, and the second layer form a wall. The first structure has a first plurality of channels extending towards a number of edges of the first structure. The second structure has a second plurality of channels extending towards the number of edges of the second structure. A first side of the first structure is connected to the first side of the second structure. The first plurality of channels and the second plurality of channels have an orientation with respect to each other. The first layer is connected to a second side of the first structure and the second layer is connected to the second side of the second structure.

As used herein, a first component "connected to" a second component means that the first component can be connected directly or indirectly to the second component. In other words, additional components may be present between the first component and the second component. When the first component is directly connected to the second component, no additional components are present between the two components.

Figure 3:
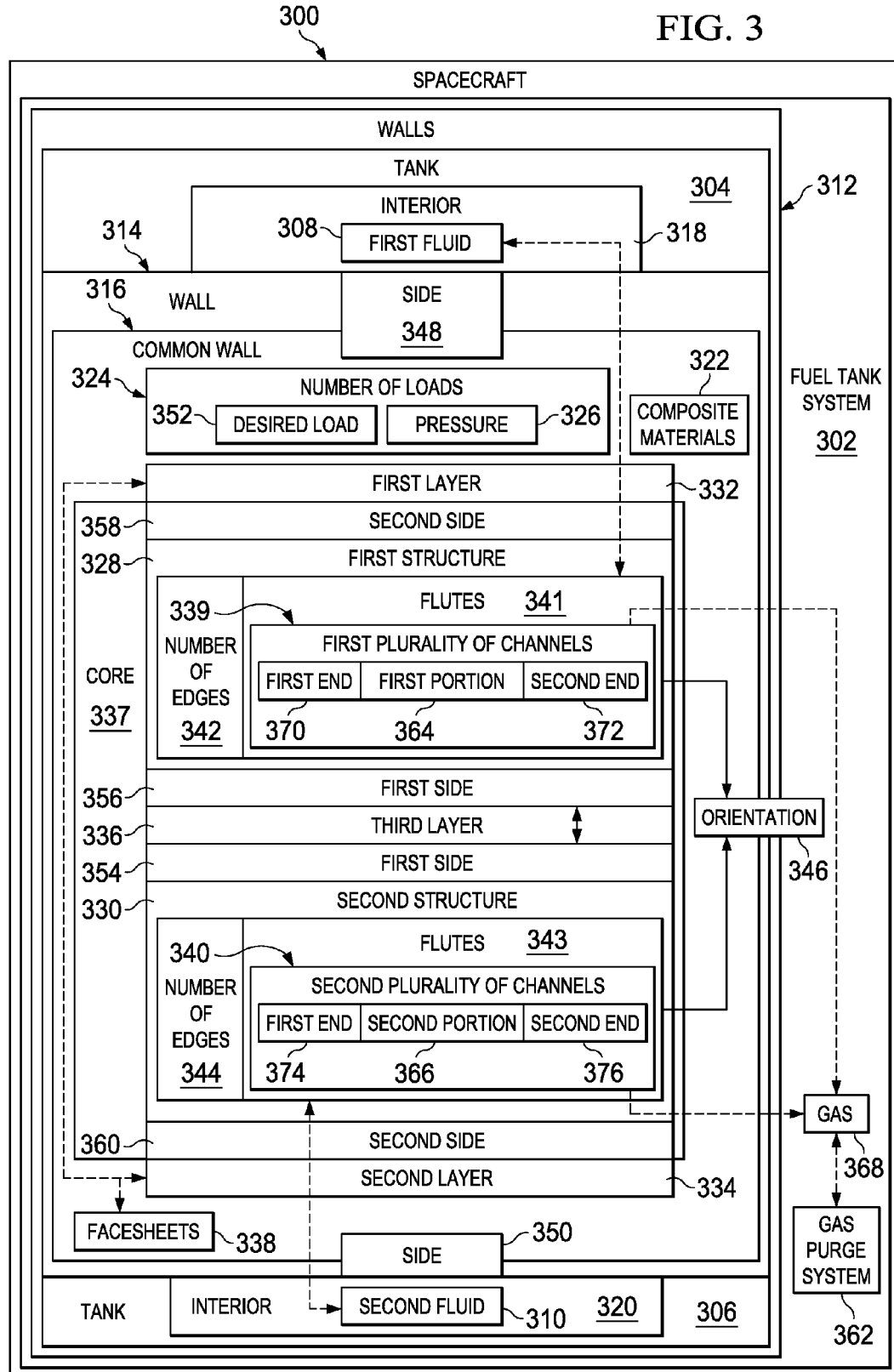
FIG. 3 is an illustration of a spacecraft in accordance with an advantageous embodiment.

With reference now to FIG. 3, an illustration of a spacecraft is depicted in accordance with an advantageous embodiment. Spacecraft 300 may be an example of spacecraft 200 in FIG. 2. In this illustrative example, spacecraft 300 includes fuel tank system 302. Fuel tank system 302 may be in propulsion system 208 in FIG. 2. Fuel tank system 302 comprises tank 304 and tank 306.

In these illustrative examples, tank 304 is configured to hold first fluid 308 in interior 318 of tank 304. Tank 306 is configured to hold second fluid 310 in interior 320 of tank 306. First fluid 308 and second fluid 310 may take the form of a liquid, a gas, or a combination of the two. As one illustrative example, first fluid 308 and second fluid 310 may be liquid propellants.

Tank 304 and tank 306 have walls 312. Within walls 312, wall 314 is common wall 316. Common wall 316 is a wall shared by tank 304 and tank 306. For example, common wall 316 separates interior 318 of tank 304 from interior 320 of tank 306. Common wall 316 may also be referred to as a common bulkhead.

In these illustrative examples, walls 312 comprise composite materials 322. Composite materials 322 reduce the weight of fuel tank system 302 for spacecraft 300 in these illustrative examples. Further, composite materials 322 are selected such that walls 312 have characteristics that allow walls 312 to support number of loads 324. Number of loads 324 may include, for example, pressure 326 generated by first fluid 308 in tank 304 and/or second fluid 310 in tank 306.

In these illustrative examples, common wall 316 comprises first structure 328, second structure 330, first layer 332, second layer 334, and third layer 336. In these examples, first structure 328, second structure 330, and third layer 336 form core 337 for common wall 316. First layer 332 and second layer 334 form facesheets 338 for common wall 316. First layer 332, second layer 334, and third layer 336 may be formed using composite materials 322. As one illustrative example, composite materials 322 for third layer 336 may be selected to have a desired level of thermal insulation.

First side 356 of first structure 328 is connected to first side 354 of second structure 330. First layer 332 is connected to second side 358 of first structure 328. Second layer 334 is connected to second side 360 of second structure 330. Further, in these illustrative examples, third layer 336 may be located between first structure 328 and second structure 330. In this manner, first structure 328 and second structure 330 form core 337 between facesheets 338.

As depicted, third layer 336 connects first side 356 of first structure 328 to first side 354 of second structure 330. Of course, in some illustrative examples, first structure 328 and second structure 330 may be directly connected to each other without intervening components, such as third layer 336. In yet other illustrative examples, additional layers may be present in addition to third layer 336.

First structure 328 has first plurality of channels 339 and second structure 330 has second plurality of channels 340. First plurality of channels 339 and second plurality of channels 340 may be formed by a first plurality of elongate structures and a second plurality of elongate structures, respectively. The first plurality of elongate structures may be, for example, flutes 341. The second plurality of elongate structures may be, for example, flutes 343. A flute is an elongate structure having a number of walls that form a channel. In these illustrative examples, the channel formed by the flute is open at both ends of the channel.

In this manner, first structure 328 comprises flutes 341, and second structure 330 comprises flutes 343. Flutes 341 and flutes 343 may be comprised of composite materials, such as laminate composite materials.

Additionally, in these depicted examples, flutes 341 forming first plurality of channels 339 may be arranged substantially parallel to each other such that the channels are substantially parallel to each other. Similarly, flutes 343 forming second plurality of channels 340 may be arranged substantially parallel to each other such that the channels are substantially parallel to each other.

In this manner, first plurality of channels 339 may be substantially straight and parallel to each other, while second plurality of channels 340 may be substantially straight and parallel to each other. Of course, in other illustrative examples, channels within first plurality of channels 339 and/or second plurality of channels 340 may be curved or have some other suitable shape.

First plurality of channels 339 and second plurality of channels 340 have orientation 346 with respect to each other. For example, first plurality of channels 339 and second plurality of channels 340 may be substantially perpendicular or have orientation 346 that is about 90 degrees with respect to each other. In other words, first plurality of channels 339 may be arranged substantially perpendicular to second plurality of channels 340. Orientation 346 may be selected such that desired load 352 can be carried within number of loads 324 on wall 314.

First plurality of channels 339 in first structure 328 extends towards number of edges 342 of first structure 328. In other words, the open ends of first plurality of channels 339 are located at or near number of edges 342 of first structure 328. Second plurality of channels 340 in second structure 330 extends towards number of edges 344 of second structure 330. The open ends of second plurality of channels 340 are located at or near number of edges 344 of second structure 330.

In other words, side 348 of common wall 316 is on interior 318 of tank 304 and side 350 is on interior 320 of tank 306. First plurality of channels 339 and second plurality of channels 340 do not extend toward side 348 and side 350. Instead, at least a portion of these channels may extend toward number of edges 342 and number of edges 344 as described above.

In these illustrative examples, first structure 328 and second structure 330 may reduce a possibility that first fluid 308 from tank 304 and second fluid 310 from tank 306 may contact each other. In these illustrative examples, a portion of first fluid 308 from tank 304 may enter first plurality of channels 339, while a portion of second fluid 310 from tank 306 may enter second plurality of channels 340. The orientation of these channels reduces a possibility that these liquids may mix or combine.

Additionally, first plurality of channels 339 and second plurality of channels 340 are configured to allow for first fluid 308 that may enter first plurality of channels 339 and/or second fluid 310 that may enter second plurality of channels 340 to be removed from common wall 316 without first fluid 308 and second fluid 310 in these channels combining with each other. First fluid 308 and/or second fluid 310 may enter first plurality of channels 339 and/or second plurality of channels 340, respectively, by permeating into common wall 316 through first layer 332 and/or second layer 334, respectively.

In these illustrative examples, gas purge system 362 is connected to first portion 364 of first plurality of channels 339 and second portion 366 of second plurality of channels 340. First portion 364 may be some or all of first plurality of channels 339 and second portion 366 may be some or all of second plurality of channels 340.

Gas purge system 362 is configured to move gas 368 through first portion 364 of first plurality of channels 339 to remove any of first fluid 308 in first plurality of channels 339. For example, gas purge system 362 may move gas 368 from first end 370 of first portion 364 to second end 372 of first portion 364 in first plurality of channels 339. In a similar fashion, gas purge system 362 is configured to move gas 368 from first end 374 in second portion 366 to second end 376 of second portion 366 of second plurality of channels 340 to remove second fluid 310 in second plurality of channels 340.

In these illustrative examples, the temperature of gas 368 introduced into common wall 316 may be controlled. For example, the temperature for gas 368 moved into first plurality of channels 339 may be different than the temperature for gas 368 moved into second plurality of channels 340. These temperatures may be controlled to manage the transfer of heat within common wall 316 by first fluid 308 and/or second fluid 310 in common wall 316.

The illustration of spacecraft 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in other illustrative examples, additional structures in addition to first structure 328 and second structure 330 may be located between first layer 332 and second layer 334 in wall 314. In other examples, a number of additional layers may be located between first structure 328 and second structure 330 in addition to third layer 336. In still other illustrative examples, third layer 336 may be omitted. In some examples, gas purge system 362 may be omitted depending on the particular implementation.

In other illustrative examples, gas 368 may be introduced into first plurality of channels 339, while another gas is introduced into second plurality of channels 340. Similarly, gas 368 may be introduced into second plurality of channels 340, while another gas is introduced into first plurality of channels 339.

Additionally, although the examples in FIG. 3 are directed towards spacecraft 300, other advantageous embodiments may be directed towards other types of platforms in which tanks may be used. For example, the different advantageous embodiments may be applied to an aircraft, a submarine, a surface ship, a plant, a factory, a manufacturing facility, a storage facility, or some other suitable type of platform in which tanks with common walls may be present that are configured to hold fluids.

In some illustrative examples, first layer 332, second layer 334, and third layer 336 may be comprised of materials other than composite materials. For example, these layers may be comprised of metal, a metal alloy, plastic, and/or other suitable types of materials. Further, although flutes 341 and flutes 343 are used to form first plurality of channels 339 and second plurality of channels 340, respectively, other types of elongate structures may be used in other illustrative examples.

Additionally, although tank 304 and tank 306 are part of fuel tank system 302, these tanks may be used to hold other fluids other than liquid propellants or fuel. As one illustrative example, these tanks may be used to hold oxygen for life support or environmental systems in spacecraft 300. In other examples, different types of liquids and/or gases may be held in tank 304 and tank 306.

Figure 4:
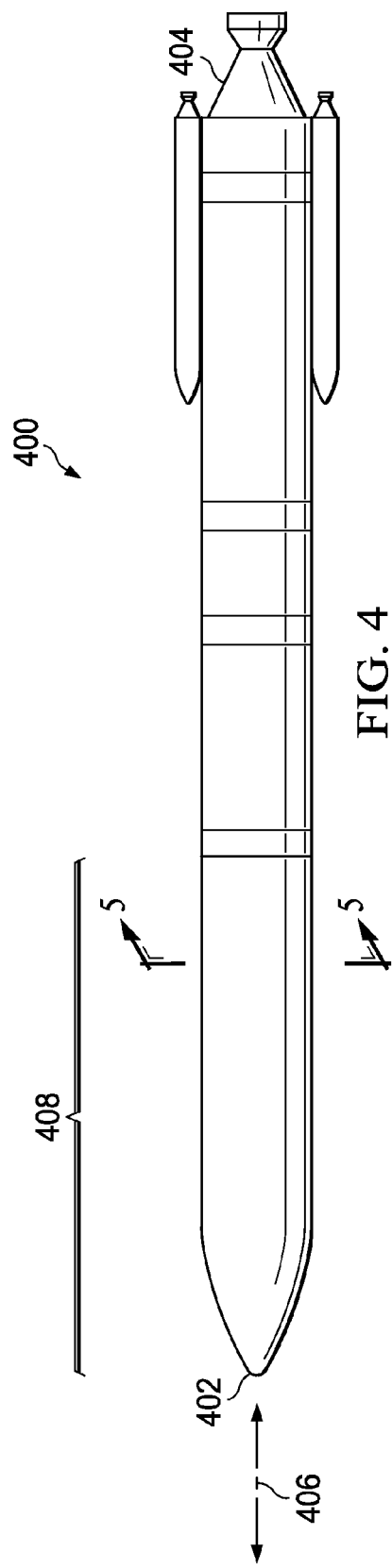
FIG. 4 is an illustration of a spacecraft in accordance with an advantageous embodiment.

With reference now to FIG. 4, an illustration of a spacecraft is depicted in accordance with an advantageous embodiment. In this example, launch vehicle 400 is an example of one implementation of spacecraft 300 in FIG. 3. Launch vehicle 400 has forward section 402 and aft section 404. Launch vehicle 400 may have longitudinal axis 406. Launch vehicle 400 is an example of a spacecraft in which fuel tank system 302 in FIG. 3 may be implemented. Section 408 may be an example of a portion of launch vehicle 400 in which fuel tank system 302 may be found and/or implemented.

Figure 5:
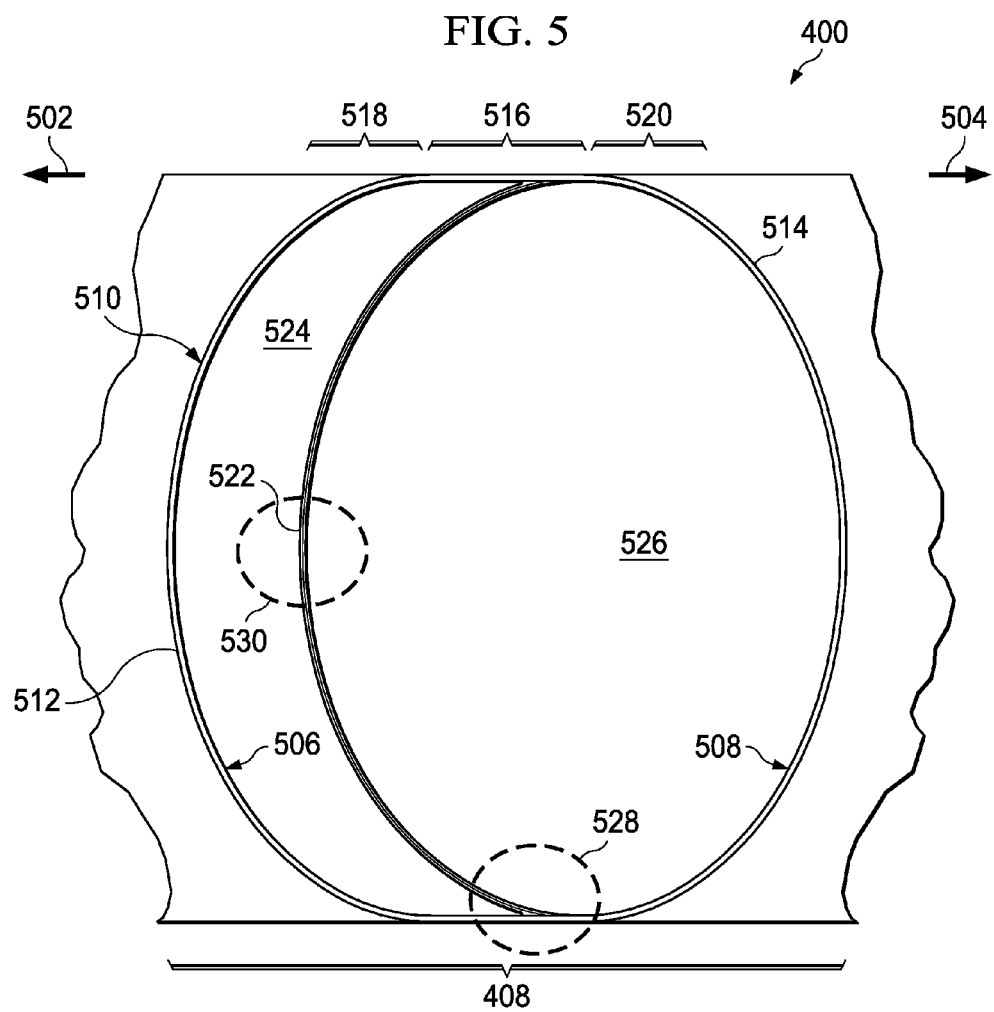
FIG. 5 is an illustration of a cut-away side view of a portion of a launch vehicle in accordance with an advantageous embodiment.

With reference now to FIG. 5, an illustration of a cut-away side view of a portion of a launch vehicle is depicted in accordance with an advantageous embodiment. In this diagram, a cut-away side view of section 408 of launch vehicle 400 taken along lines 5-5 in FIG. 4 is depicted. This view allows the interior of launch vehicle 400 to be presented.

In this illustrative example, arrow 502 points towards the forward part of launch vehicle 400. Arrow 504 points towards the aft portion of launch vehicle 400.

As depicted, launch vehicle 400 includes tank 506 and tank 508. Tank 506 and tank 508 are formed by walls 510. Walls 510 may include dome 512 and dome 514. In addition, walls 510 also may include wall 516.

Wall 516 may be a cylindrical wall in these illustrative examples. Wall 516 may be attached to forward skirt 518 and aft skirt 520. In other words, wall 516 may be located between forward skirt 518 and aff skirt 520.

In this illustrative example, walls 510 also include wall 522. Wall 522 is also referred to as a common bulkhead. Wall 522 has a curved shape in which tank 506 is on the convex side of wall 522 and tank 508 is on the concave side of wall 522. This curved shape may also be referred to as a dome.

As can be seen, walls 510 enclose interior 524 of tank 506 and interior 526 of tank 508. Fluids may be located within interior 524 and interior 526. Interior 524 and interior 526 may be pressurized at different pressures.

Wall 522 is an example of one implementation for wall 314 in FIG. 3. The different structures and layers comprising wall 314 may be implemented in wall 522.

Figure 7:
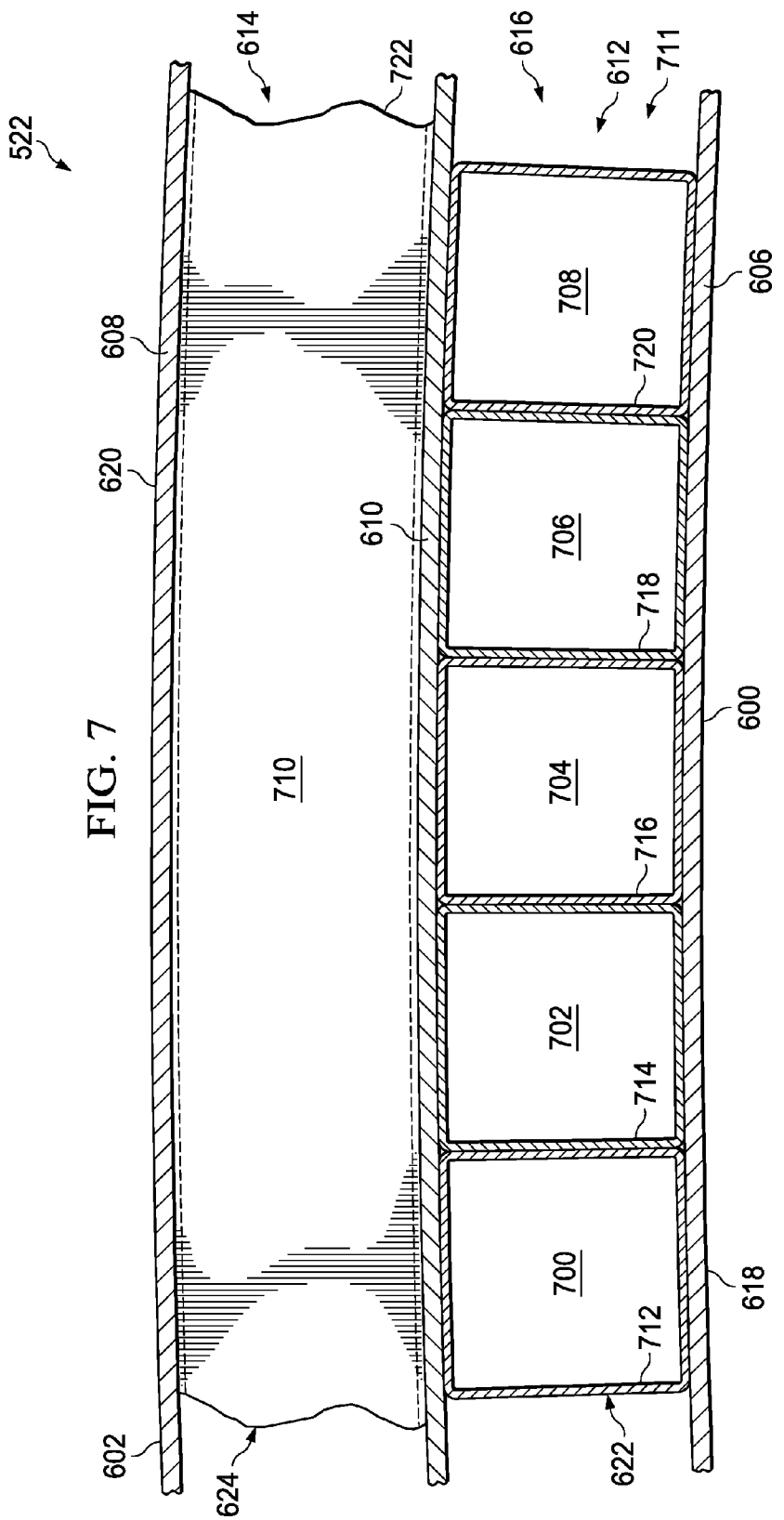
FIG. 7 is an illustration of a cross section of a wall in accordance with an advantageous embodiment.
Figure 8:
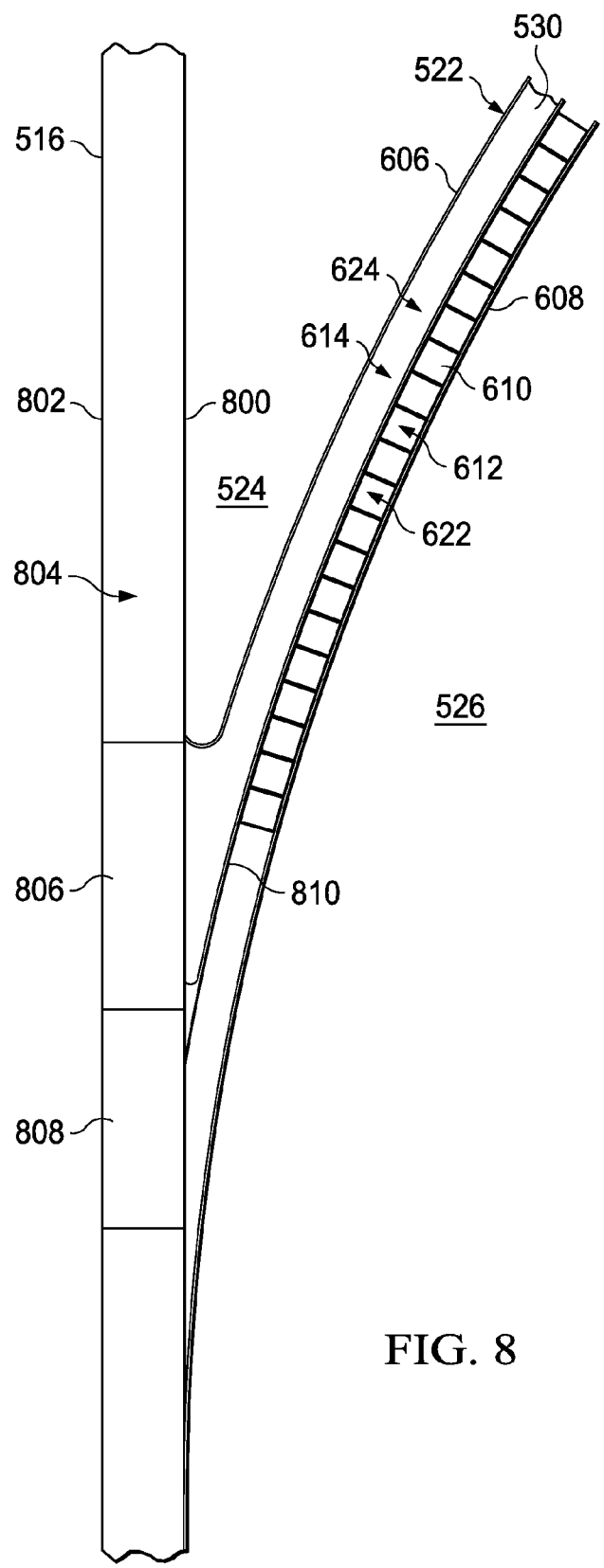
FIG. 8 is an illustration of a common wall between tanks in accordance with an advantageous embodiment.

A more detailed illustration of wall 522 in section 528 is depicted in FIG. 7 below. A more detailed illustration of wall 516 and wall 522 in section 530 is depicted in FIG. 8 below.

Figure 6:
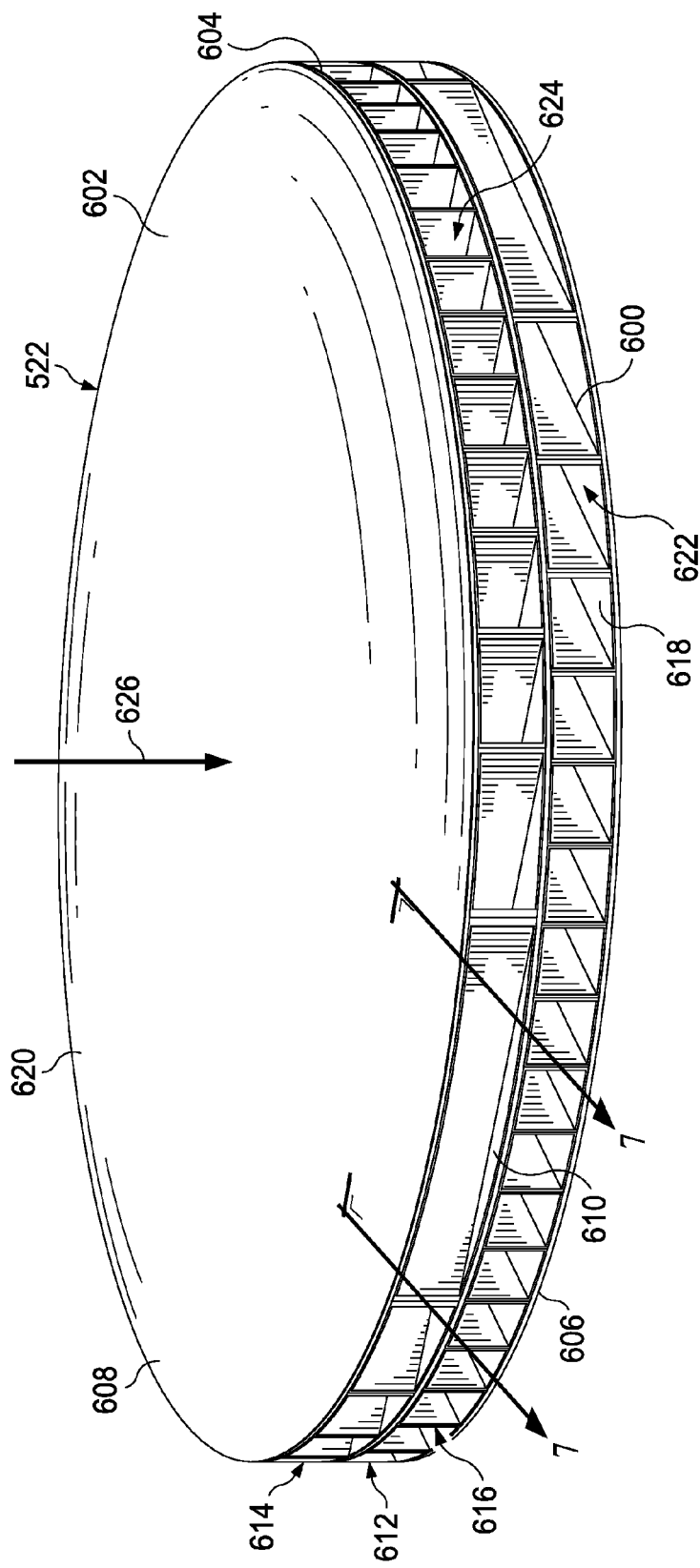
FIG. 6 is a perspective view of a common wall for tanks in accordance with an advantageous embodiment.

Turning now to FIG. 6, a perspective view of a common wall for tanks is depicted in accordance with an advantageous embodiment. In this illustrative example, wall 522 has side 600 and side 602. Side 600 is on interior 524 of tank 506 in FIG. 5 and side 602 is on interior 526 of tank 508 in FIG. 5. In addition, wall 522 has edge 604.

In these illustrative examples, wall 522 is comprised of first layer 606, second layer 608, third layer 610, first structure 612, and second structure 614. First structure 612, second structure 614, and third layer 610 are sandwiched between first layer 606 and second layer 608. First structure 612, second structure 614, and third layer 610 form core 616.

First layer 606 may be facesheet 618 on side 600. Second layer 608 may be facesheet 620 on side 602. First structure 612 is connected to second structure 614 by third layer 610 in these illustrative examples. These layers also may be referred to as laminates depending on the particular implementation.

First layer 606 is connected to first structure 612 and second layer 608 is connected to second structure 614. First structure 612 has channels 622 while second structure 614 has channels 624. As can be seen, channels 622 and channels 624 extend towards edge 604 of wall 522 instead of to side 600 and side 602. The configuration of channels 622 and channels 624 are also referred to as fluted channels.

The orientation of channels 622 and channels 624 is in contrast to the orientation of channels or cells used in a honeycomb structure. Additionally, channels 622 and channels 624 have an orientation with respect to each other. As can be seen in this illustrative example, channels 622 run in a direction that is substantially perpendicular or at about 90 degrees to channels 624. The orientation of channels 622 and 624 are selected to increase loads 626 which may be applied to wall 522. In selecting the orientation of channels 622 and channels 624, the selection is made such that the orthotropic design of these structures may be closer to an isotropic core.

Further, in these different advantageous embodiments, first layer 606, second layer 608, and third layer 610 are fabricated using composite materials, such as composite materials 322 in FIG. 3. Each layer may be fabricated using materials such as, for example, without limitation, fabric, tape, and other suitable materials that may be infused with, or impregnated with, a resin.

With reference now to FIG. 7, an illustration of a cross section of a wall is depicted in accordance with an advantageous embodiment. In this illustrative example, wall 522 is seen in a cross sectional view taken along lines 7-7 in FIG. 6. A more detailed view of section 530 in FIG. 5 is illustrated. Further, a more detailed illustration of a portion of first structure 612 and a portion of second structure 614 is depicted in this example.

In this illustrative example, channel 700, channel 702, channel 704, channel 706, and channel 708 are examples of some channels that make up channels 622 in first structure 612. Channel 710 from channels 624 in second structures 614 is depicted in this view.

In the depicted examples, these channels extend through plurality of elongate structures 711 that form first structure 612 and second structure 614. For example, plurality of elongate structures 711 includes elongate structures 712, 714, 716, 718, 720, and 722. Elongate structures 712, 714, 716, 718, and 720 are examples of elongate structures within first structure 612. Elongate structure 722 is an example of an elongate structure located within second structure 614. These elongate structures may also be referred to as flutes. In these illustrative examples, elongate structures 712, 714, 716, 718, and 720 are arranged substantially perpendicular to elongate structure 722.

As depicted, channel 700 extends through elongate structure 712, channel 702 extends through elongate structure 714, channel 704 extends through elongate structure 716, channel 706 extends through elongate structure 718, and channel 708 extends through elongate structure 720. In this example, channel 710 extends through elongate structure 722.

In these illustrative examples, each of these channels has a cross section with a shape that is substantially square. Of course, the shape of the cross sections may take other forms. For example, the shape of the cross sections may be, for example, without limitation, a rectangle, a trapezoid, a hexagon, or some other suitable type of shape.

Further, the shapes in channels 622 may be different from the shapes in channels 624. For example, channel 700, channel 704, and channel 708 may be square in shape, while channel 702 and channel 706 may be rectangular in shape. Of course, other variations of shapes may be used depending on the particular implementation.

In this illustrative example, first structure 612 and second structure 614 may provide a separation between liquids on side 600 and side 602. Third layer 610 may provide additional separation in addition to the elongate structures that form first structure 612 and second structure 614.

With reference now to FIG. 8, an illustration of a common wall between tanks is depicted in accordance with an advantageous embodiment. In this illustrative example, a more detailed view of section 530 in FIG. 5 is illustrated.

In this illustrative example, wall 522 in this view has first layer 606, second layer 608, third layer 610, first structure 612, and second structure 614. As in FIG. 7, first structure 612 and second structure 614 are sandwiched between first layer 606 and second layer 608. Third layer 610 provides an additional layer of separation between first structure 612 and second structure 614 and connects first structure 612 to second structure 614.

As depicted in this example, wall 522 is connected to wall 516. Wall 522 may be connected to wall 516 in a number of different ways. For example, without limitation, wall 522 may be bonded to, co-cured with, or otherwise connected to wall 516.

Further, in this illustrative example, wall 516 has a similar construction to wall 522. As depicted, wall 516 has first layer 800 and second layer 802. Additionally, wall 516 includes core 804. Core 804 may be formed in a similar fashion to core 616 in FIG. 6.

In addition, wall 516 also has channel 806 and channel 808. Channel 808 is connected to at least a portion of channels 622 in first structure 612 of wall 522. Channel 806 is connected to at least a portion of channels 624 in structures 614 in wall 522.

Channel 806 and channel 808 may be part of a purge system. Any fluids that enter channels 622 from interior 526 may be removed from channels 622 through channel 808. Any fluids that enter channels 624 from interior 526 may be removed through channel 806.

In these illustrative examples, fluids may enter channels 622 and 624 from interior 524 and interior 526. For example, fluids may permeate, leak, or otherwise cross first layer 606 and/or second layer 608 into channels 622 and channels 624.

In addition to forming channels, plurality of elongate structures 711 provides a separation between a liquid that may enter channels 622 from interior 526 from mixing with a liquid that enters channels 624 from interior 524. Additionally, third layer 610 provides an additional separation between liquids that may enter the channels. In this manner, a reduction in the possibility of different liquids mixing with each other may be achieved.

Further, any liquids that enter the channels may be removed through the purge system as well as channel 806 and channel 808. For example, a gas may be introduced into channels 622 through channel 808 and into channels 624 through channel 806 using the purge system. This gas may remove or sweep away the fluids in channels 622 and channels 624 such that the fluids enter channel 806 and channel 808. In this manner, the fluids from interior 524 do not mix or combine with fluids from interior 526 in wall 522.

In this illustrative example, purge flow separator 810 provides an additional separation between the channels such that gas to be introduced into channels 622 does not mix or combine with gas to be introduced into channels 624. Further, purge flow separator 810 provides separation between fluids from channels 622 entering channel 808 and fluids from channels 624 entering channel 806. Purge flow separator 810 may be comprised of, for example, without limitation, composite materials.

The illustrations of wall 522 in FIGS. 5-8 are not meant to imply physical or architectural limitations to the manner in which wall 522 may be implemented. Wall 522 is presented merely as one physical implementation of wall 314 in FIG. 3. For example, additional structures in addition to first structure 612 and second structure 614 may be used within core 616. Further, in some illustrative examples, third layer 610 may be omitted.

Figure 9:
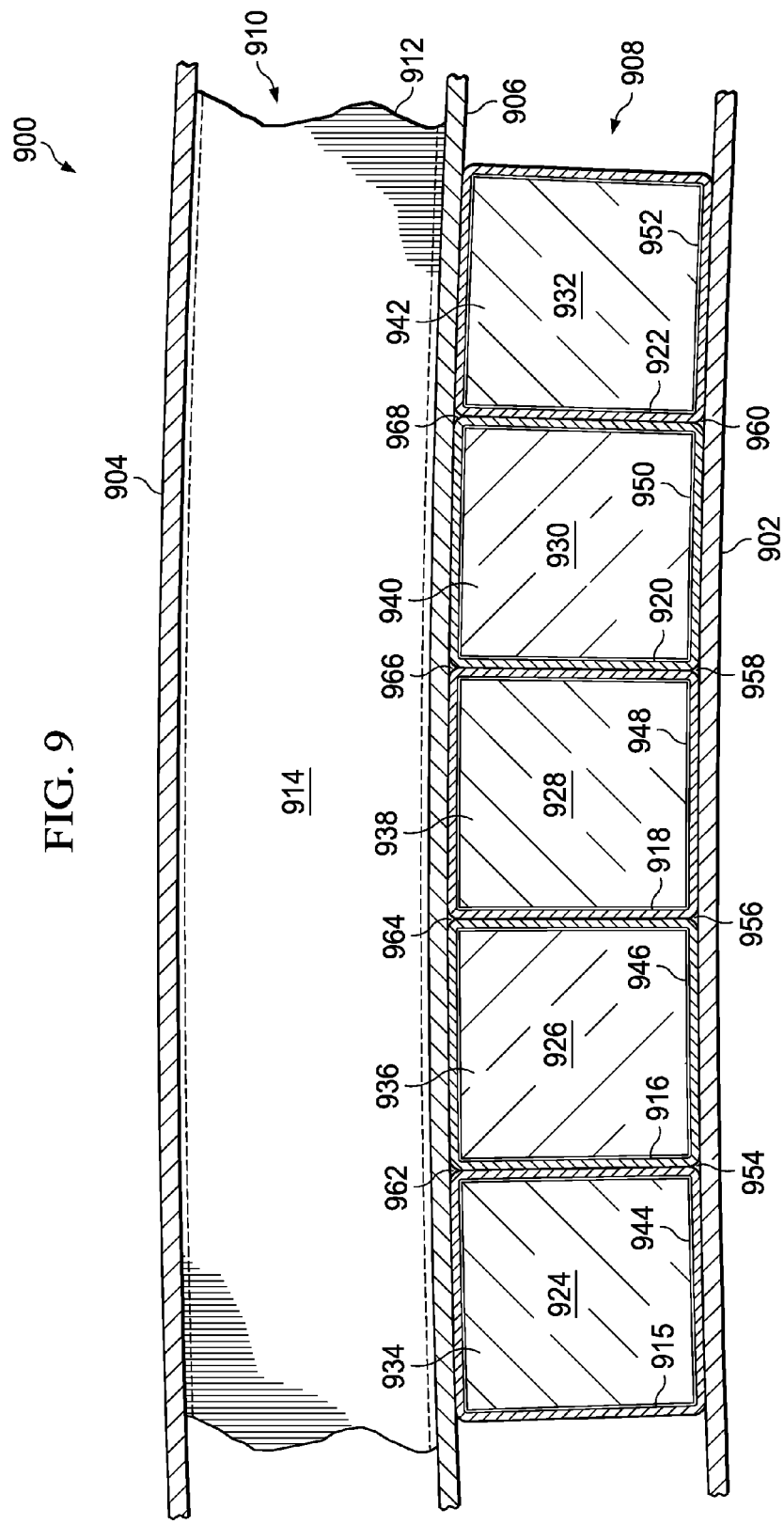
FIG. 9 is an illustration of a cross-sectional view of a lay up of materials for forming a wall in accordance with an advantageous embodiment.

With reference now to FIG. 9, an illustration of a cross-sectional view of a lay up of materials for forming a wall is depicted in accordance with an advantageous embodiment. In this illustrative example, wall 900 is an example of one implementation for wall 314 in FIG. 3 and wall 522 in FIG. 5 prior to curing of wall 900.

Wall 900 comprises first layer 902, second layer 904, third layer 906, first structure 908, and second structure 910. As can be seen in these illustrative examples, elongate structure 912 with channel 914 is depicted. Other elongate structures having channels in elongate structure 912 are present, are but not shown in this view.

In first structure 908, elongate structures 915, 916, 918, 920, and 922 are illustrated. These elongate structures have channels 924, 926, 928, 930, and 932 respectively. Elongate structures 912, 915, 916, 918, 920, and 922 may also be referred to as flutes.

In these illustrative examples, first layer 902, second layer 904, third layer 906, first structure 908, and second structure 910 are comprised of composite materials. In this illustrative example, these components in wall 900 are in an uncured form. The different layers and structures may be made with the same composite materials or different composite materials. Further, the different layers and structures may have different thicknesses depending on the particular implementation.

For example, without limitation, the composite materials may take the form of fabric containing fibers. A resin may be present or impregnated into the fabric to form a prepreg. Layers of fabric may be placed over each other to form each of first layer 902, second layer 904, third layer 906, first structure 908, and second structure 910. In other words, each of these components may be formed from layers of fabric that are laid over each other. The layers of fabric forming a component may have different orientations depending on the particular implementation.

The fibers may be comprised of at least one of glass fibers, graphite fibers, para-aramid fibers, and other suitable types of fibers. The resin may be, for example, at least one of an epoxy, bismaleimide, a polyimide, and other suitable types of resins.

In yet another illustrative example, the composite materials may take the form of tape with resin infused into the tape. Of course, other types of composite materials used to form structures for vehicles may be used depending on the particular implementation.

In some illustrative examples, first structure 908 and second structure 910 may be comprised of a material different from first layer 902 and second layer 904. For example, the elongate structures forming first structure 908 and second structure 910 may be comprised of glass fibers, a combination of glass and graphite fibers, and other suitable types of materials. For example, in some cases, fiberglass may be used.

Materials for first layer 902 and second layer 904 may be selected as ones that may provide strength and/or may reduce the possibility of liquids moving across these layers. Further, these factors may be used in selecting materials for third layer 906. Additionally, the materials, which may be composite materials, also may be selected as ones that provide thermal insulation.

For example, third layer 906 may be comprised of different types of materials as compared to first layer 902 and second layer 904. Third layer 906 may be comprised of composite materials selected to have a desired level of thermal insulation. In addition, similar considerations may be made with respect to selecting materials for first layer 902 and second layer 904. These layers also may be selected as having composite materials that provide thermal insulation.

In the different illustrative examples, the materials may be selected to take into account both strength and thermal insulation. As another example of a selection of composite materials, the selection of material may be made such that the coefficient of thermal expansion has values within a range or a threshold between the different components.

In these examples, each elongate structure may be formed separately and then placed onto composite materials for second layer 904. Thereafter, third layer 906 may be placed over the elongate structures. Then, elongate structures for first structure 908 may be placed onto third layer 906. Thereafter, composite materials for first layer 902 may be laid on the elongate structures.

In these illustrative examples, mandrels 934, 936, 938, 940, and 942 are present within channels 924, 926, 928, 930, and 932 respectively. These mandrels provide a structure to maintain the shape of elongate structures. The mandrels may take different forms. For example, the mandrels may be comprised of rubber, plastic, wax, and other suitable materials.

For example, some mandrels may be comprised of a material that may be elastic above a selected temperature. This temperature may be a temperature for when materials are cured. Thereafter, when the temperature is reduced below the selected temperature, the mandrel may recover or return to its original shape. In this manner, the mandrel may be removed when in its elastic form. In still other illustrative examples, the mandrels may take the form of bladders which may be inflated with a gas or liquid.

Further, separation films 944, 946, 948, 950, and 952 may be placed around mandrels 934, 936, 938, 940, and 942 within the channels. These separation films may allow for easier removal of the mandrels. Additionally, when mandrels comprised of wax are used, separation films may allow for removal of any wax that may remain in the channels after curing of elongate structures.

In addition, noodles 954, 956, 958, 960, 962, 964, 966, and 968 may be placed in spaces between elongate structures 915, 916, 918, 920, and 922. These noodles may be comprised of composite materials. These noodles may be placed down at the same time as the elongate structures and mandrels are placed onto a layer. After all of the different components for wall 900 have been layed up, these components are cured. Curing may involve the application of heat. In some cases, pressure may be applied in a chamber or through applying a vacuum to a bag placed over one or more of the components in the wall.

The illustration of wall 900 in FIG. 9 is not meant to imply physical or architectural limitations as to how a wall may be constructed. For example, depending on the type of mandrel used, separation films may not be needed. In one example, if the mandrels are formed from inflatable bladders, then a separation film is not needed to remove materials as when mandrels are made of wax.

Figure 10:
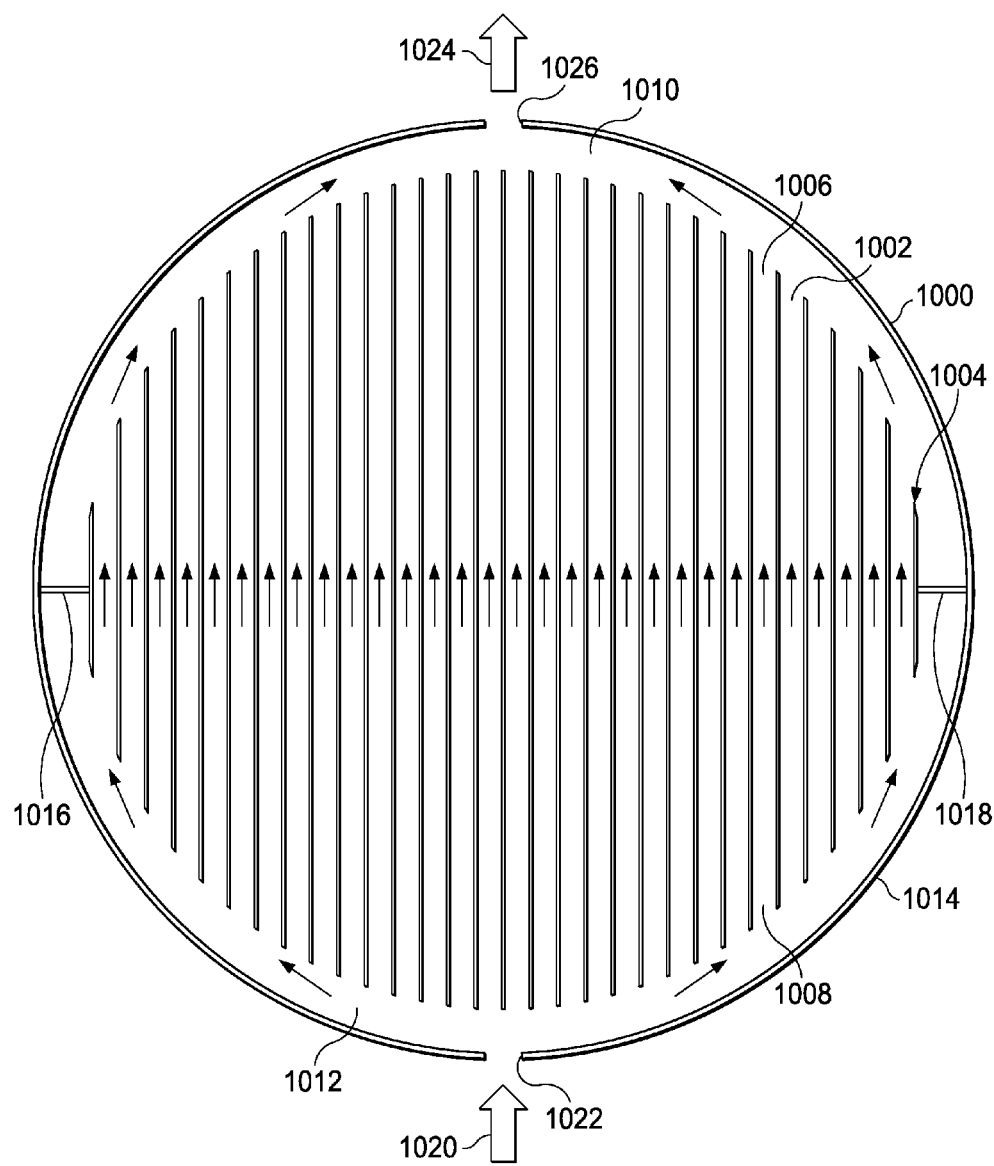
FIG. 10 is an illustration of fluid flow in channels through a purge system in accordance with an advantageous embodiment.

With reference now to FIG. 10, an illustration of fluid flow in channels through a purge system is depicted in accordance with an advantageous embodiment. In this illustrative example, wall 1000 is an example of one implementation for wall 314 in FIG. 3.

In this illustrative example, a cross section of wall 1000 is depicted. As can be seen in this illustrative example, channels 1002 in structure 1004 are depicted. Structure 1004 is an example of one implementation for first structure 328 and second structure 330 in FIG. 3. In these illustrative examples, channels 1002 extend to edge 1006 and edge 1008.

Channels 1002 at edge 1006 connect to channel 1010. Channel 1010 is a channel for gas purge system 362 in FIG. 3. Channels 1002 at edge 1008 connect to channel 1012. Channel 1012 is also connected to gas purge system 362. In these illustrative examples, channel 1010 is formed within wall 1014. Wall 1016 and wall 1018 provide a separation between channel 1010 and channel 1012.

Arrow 1020 illustrates a flow into opening 1022 in wall 1014. Arrow 1024 at opening 1026 illustrates output flow from channel 1010. In these examples, channel 1012 is connected to channel 1010 through channels 1002.

In this illustrative example, the flow may enter channel 1012 through opening 1022. The flow may then move through channels 1002 into channel 1010. The flow then exits through opening 1026 in wall 1014. In these illustrative examples, the flow may involve a fluid apart from the fluids that may enter the channels from the tank. This fluid may be a gas or liquid depending on the particular implementation.

If a fluid is selected, the fluid is selected as one that may not react with any liquid that may have entered the channels from a tank. In these illustrative examples, this flow may be caused in a number of different ways. For example, a positive pressure may be applied at opening 1022. A negative pressure or vacuum may be applied at opening 1026. In some cases, the pressure may include introducing a fluid.

Figure 11:
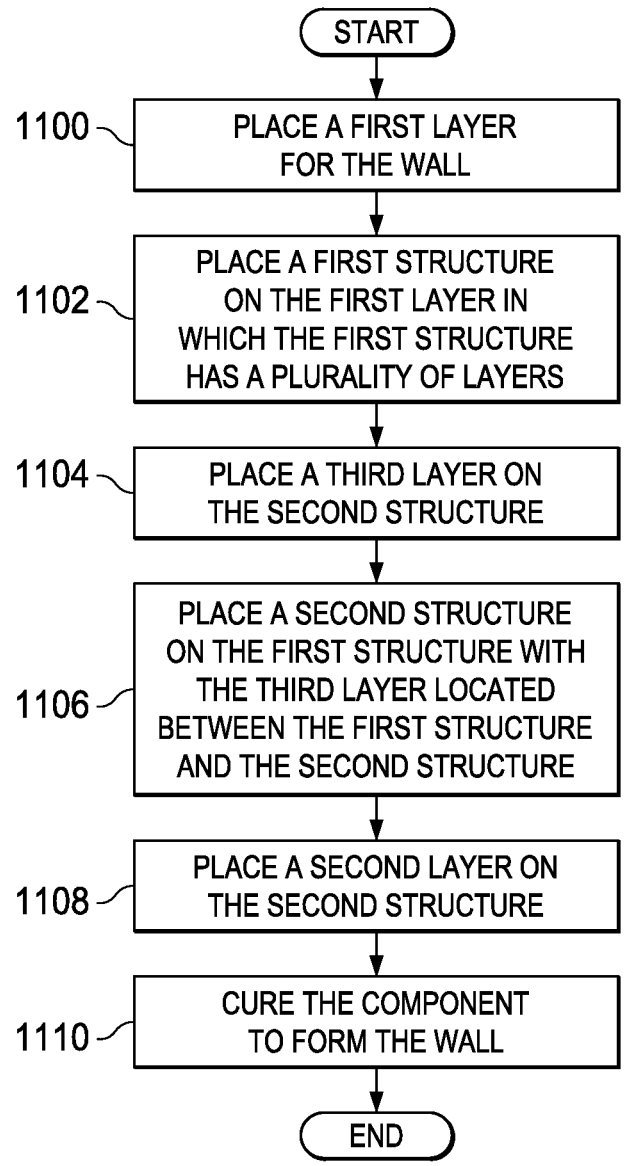
FIG. 11 is an illustration of a flowchart of a process for forming a wall in accordance with an advantageous embodiment.

With reference now to FIG. 11, a flowchart of a process for forming a wall is depicted in accordance with an advantageous embodiment. The process illustrated in FIG. 11 may be used to form wall 314 in FIG. 3.

The process begins by placing a first layer for the wall (operation 1100). In these illustrative examples, the placing step may include laying up composite materials, such as fabric, tape, or other suitable types of composite materials, with resin.

The process then places a first structure on the first layer in which the first structure has a plurality of layers (operation 1102). In these illustrative examples, a first layer, a second layer, a third layer, a first structure, and a second structure are components for the wall.

The process places a third layer on the second structure (operation 1104). The process then places a second structure on the first structure with the third layer located between the first structure and the second structure (operation 1106). The second structure has a second plurality of channels. The first plurality of channels and the second plurality of channels have an orientation with respect to each other. In different illustrative examples, the orientation is such that the channels are not parallel to each other.

The process then places a second layer on the second structure (operation 1108). The process then cures the component to form the wall (operation 1110), with the process terminating thereafter.

Figure 12:
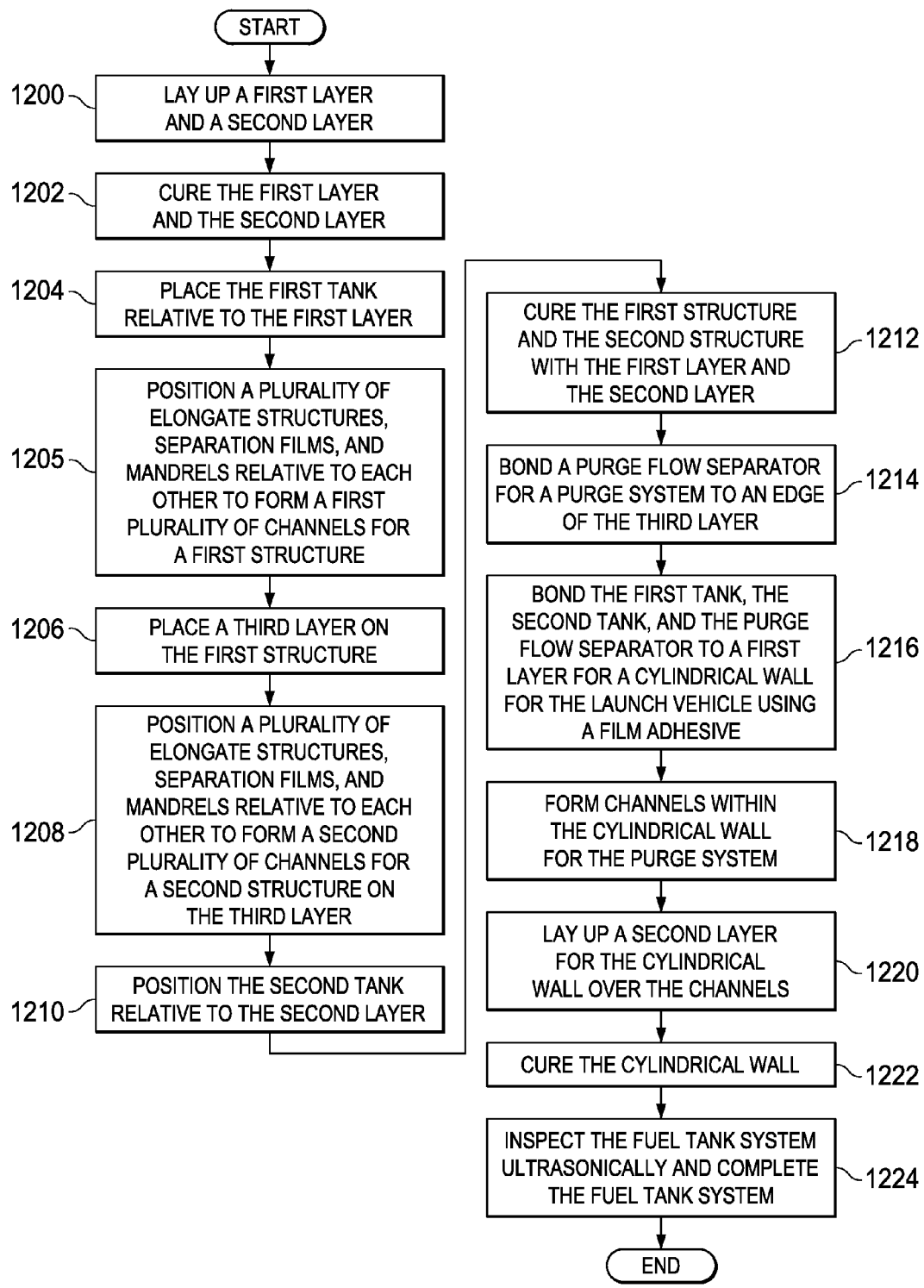
FIG. 12 is an illustration of a flowchart of a process for forming a wall for a launch vehicle in accordance with an advantageous embodiment.

With reference now to FIG. 12, an illustration of a flowchart of a process for forming a wall for a launch vehicle is depicted in accordance with an advantageous embodiment. The process illustrated in FIG. 12 may be implemented to form wall 314 in FIG. 3. This process is a more detailed process for the operations described in FIG. 11.

The process begins by laying up a first layer and a second layer (operation 1200). The first layer is for an interior of a first tank in which the side of the first layer facing the first tank has a convex shape. The second layer is for an interior of a second tank in which the side of the second layer facing the interior of the second tank has a concave shape. The first tank and the second tank are configured to hold fluids, such as propellant, in a launch vehicle, such as launch vehicle 400 in FIGS. 4 and 5. The first layer and the second layer are cured (operation 1202). The first layer and the second layer form facesheets for a wall, such as wall 522 in FIG. 5.

Then, the process places the first tank relative to the first layer (operation 1204). Thereafter, a plurality of elongate structures, separation films, and mandrels are positioned relative to each other to form a first plurality of channels for a first structure (operation 1205). A third layer is placed on the first structure (operation 1206). Next, a plurality of elongate structures, separation films, and mandrels are positioned relative to each other to form a second plurality of channels for a second structure on the third layer (operation 1208). The first plurality of channels and the second plurality of channels are substantially perpendicular to each other.

Next, the process positions the second tank relative to the second layer (operation 1210). The process then cures the first structure and the second structure with the first layer and the second layer (operation 1212).

The process then bonds a purge flow separator for a gas purge system to an edge of the third layer (operation 1214). The process bonds the first tank, the second tank, and the purge flow separator to a first layer for a cylindrical wall for the launch vehicle using a film adhesive (operation 1216). The first layer forms the inboard facesheet for the cylindrical wall. The cylindrical wall may be, for example, wall 516 in FIG. 5. Next, the process forms channels within the cylindrical wall for the purge system (operation 1218).

Thereafter, the process lays up a second layer for the cylindrical wall over the channels (operation 1220). The second layer forms the outboard facesheet for the cylindrical wall. The process then cures the cylindrical wall (operation 1222). The cylindrical wall with the first tank, the second tank, and the wall in between the first tank and the second tank form a fuel tank system.

The process then inspects the fuel tank system ultrasonically and completes the fuel tank system (operation 1224), with the processing terminating thereafter.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram. For example, in the flowchart in FIG. 11, operation 1104 may be omitted if a third layer is not needed. In this case, the second structure is placed directly on the first structure.

Thus, the different advantageous embodiments provide a method and apparatus for a wall. This wall may be a common wall between structures such as tanks in a fuel tank system for a spacecraft.

The apparatus comprises a first layer of composite materials, a second layer of composite materials, a first structure, and a second structure. The first structure has a first plurality of channels extending towards a number of edges of the first structure. The second structure has a second plurality of channels extending towards the number of edges of the second structure. A first side of the first structure is connected to the first side of the second structure. The first plurality of channels and the second plurality of channels have an orientation with respect to each other. The first layer of composite materials is connected to a second side of the first structure and the second layer of composite materials is connected to the second side of the second structure. The first structure, the second structure, the first layer, and the second layer of composite materials form a wall.

In this manner, through selecting the orientation between the first plurality of channels and the second plurality of channels, the load that may be carried by the wall may be increased. The load that can be carried also may be increased through a selection of composite materials and a thickness of the different layers and structures.

The wall in the different illustrative examples may carry a higher load as compared to other types of walls having a similar weight. As a result, increased loads may be carried in a wall that may reduce the weight as compared to other types of walls that may be used to carry substantially the same loads.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A fuel system of a platform selected from one of a spacecraft, an aircraft, a submarine, and a surface ship, the fuel system of the platform comprising:
a first fuel tank configured to hold a first liquid and a second fuel tank configured to hold a second liquid, the first fuel tank and the second fuel tank separated by a common wall, the common wall comprising:
a first structure comprising a first plurality of flutes, wherein the flutes form a first plurality of channels extending towards a first number of edges of the first structure;
a second structure comprising a second plurality of flutes, wherein the flutes form a second plurality of channels extending towards a second number of edges of the second structure, wherein a first side of the first structure is connected to a second side of the second structure and wherein the first plurality of channels and the second plurality of channels have an orientation with respect to each other;
a first layer connected to a third side of the first structure that is opposite the first side, the first layer comprising a first composite facesheet facing a first inside of the first fuel tank, the first layer being permeable to a first fuel stored in the first fuel tank; and
a second layer connected to a fourth side of the second structure that is opposite the second side, the second layer comprising a second composite facesheet facing a second inside of the second fuel tank, the second layer being permeable to a second fuel stored in the second fuel tank, and wherein the first side and the second side are connected at a third layer that separates the first fuel and the second fuel, wherein the first structure, the second structure, the first layer, and the second layer form a wall, and wherein the wall is a common wall between the first fuel tank and the second fuel tank.

2. The fuel system of claim 1, wherein the first structure, the second structure, the first layer, and the second layer form the common wall and wherein the first plurality of channels and the second plurality of channels have the orientation with respect to each other such that the common wall is configured to carry a desired load.

3. The fuel system of claim 1, wherein the orientation of the first plurality of channels and the second plurality of channels with respect to each other is about ninety degrees.

4. The fuel system of claim 1 further comprising:
a third layer located between the first structure and the second structure, wherein the third layer connects the second side of the second structure to the first side of the first structure.

5. The fuel system of claim 1 further comprising:
a gas purge system connected to a first portion of the first plurality of channels and a second portion of the second plurality of channels, wherein the gas purge system is configured to move gas from a first edge of the first portion of the first plurality of channels to a second edge of the first portion of the first plurality of channels and move the gas from a third edge of the second portion of the second plurality of channels to a fourth edge of the second portion of the second plurality of channels.

6. The fuel system of claim 1, wherein the first plurality of channels and the second plurality of channels have a cross section with a shape selected from at least one of a square, a rectangle, a trapezoid, and a hexagon.

7. The fuel system of claim 4, wherein the third layer is comprised of a composite material selected to have a desired level of thermal insulation.

8. A platform selected from one of a spacecraft, an aircraft, a submarine, and a surface ship, the platform further comprising:
a bulkhead forming a common wall between a first fuel tank and a second fuel tank, the bulkhead comprising:
a first structure comprising first flutes arranged substantially parallel to each other and forming a first plurality of substantially parallel channels extending towards a first number of edges of the first structure;
a second structure comprising second flutes arranged substantially parallel to each other and forming a second plurality of substantially parallel channels extending towards a second number of edges of the second structure, wherein a first side of the first structure is connected to a second side of the second structure and wherein the first plurality of substantially parallel channels and the second plurality of substantially parallel channels have an orientation with respect to each other such that the channels of the first plurality of substantially parallel channels are not parallel to the channels of the second plurality of substantially parallel channels;

a first layer connected to a third side of the first structure that is opposite the first side, the first layer comprising a first composite facesheet facing a first inside of the first fuel tank, the first layer being permeable to a first fuel stored in the first fuel tank;

a second layer connected to a fourth side of the second structure that is opposite the second side, the second layer comprising a second composite facesheet facing a second inside of the second fuel tank, the second layer being permeable to a second fuel stored in the second fuel tank, and wherein the first side and the second side are connected at a third layer that separates the first fuel and the second fuel; and a third layer located between the first structure and the second structure, the third layer impermeable to the first fuel and the second fuel, wherein the first structure, the second structure, the first layer, the second layer, and the third layer form the common wall, and wherein the common wall between the first fuel tank and the second fuel tank.

9. A fuel tank system of a platform selected from one of a spacecraft, an aircraft, a submarine, and a surface ship, the fuel tank system comprising:

a first fuel tank having a first side comprising a first plurality of elongate structures and having a first plurality of channels extending towards a first number of edges of the first structure;

a second fuel tank having a second side comprising a second plurality of elongate structures and having a second plurality of channels extending towards a second number of edges of the second structure, wherein the first side of the first tank is connected to the second side of the second tank and wherein the first plurality of channels and the second plurality of channels have an orientation with respect to each other;

a first layer connected to the first side of the first structure that is opposite the first side, the first layer comprising a first composite facesheet facing a first inside of the first fuel tank, the first layer being permeable to a first fuel stored in the first fuel tank;

a second layer connected to the second side of the second structure that is opposite the second side, the second layer comprising a second composite facesheet facing a second inside of the second fuel tank, the second layer being permeable to a second fuel stored in the second fuel tank, and wherein the first side and the second side are connected at a third layer that separates the first fuel and the second fuel; and a third layer comprising a composite material that provides thermal insulation and located between the first structure and the second structure, the third layer impermeable to the first fuel and the second fuel, wherein the first structure, the second structure, the first layer, the second layer, and the third layer form the common wall, and wherein the common wall between the first fuel tank and the second fuel tank.

10. The fuel system of claim 1, wherein each flute of the first flutes and the second flutes comprises an elongate structure having a number of walls that form a channel of the flute, wherein the channel of the flute is open at both ends of the channel of the flute.

11. The fuel system of claim 1, wherein the first tank is a first longitudinal section of a cylindrical rocket, wherein the second tank is a second longitudinal section of the cylindrical rocket, adjacent the first longitudinal section, and wherein the first structure and the second structure together separate the first longitudinal section and the second longitudinal section.

* * * * *